(No Model.)
J. T. NOBLE.
HOSE CART.
No. 280,323. Patented June 26, 1883.
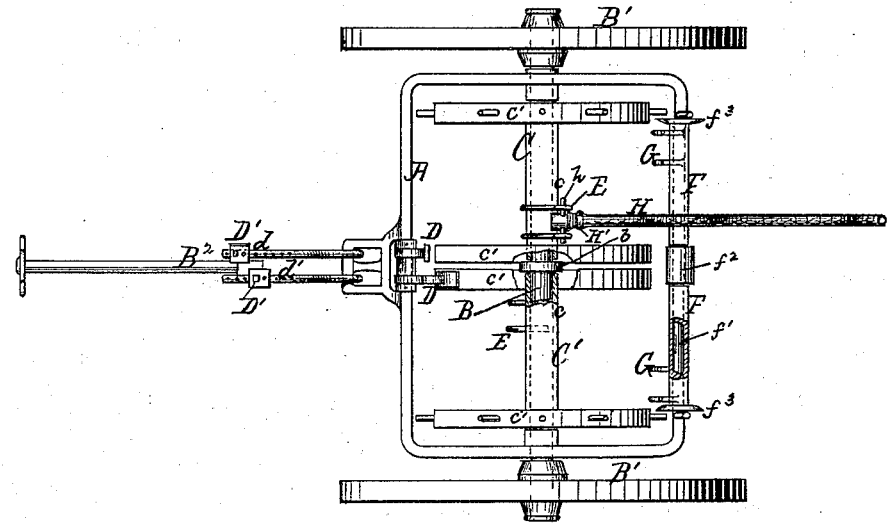
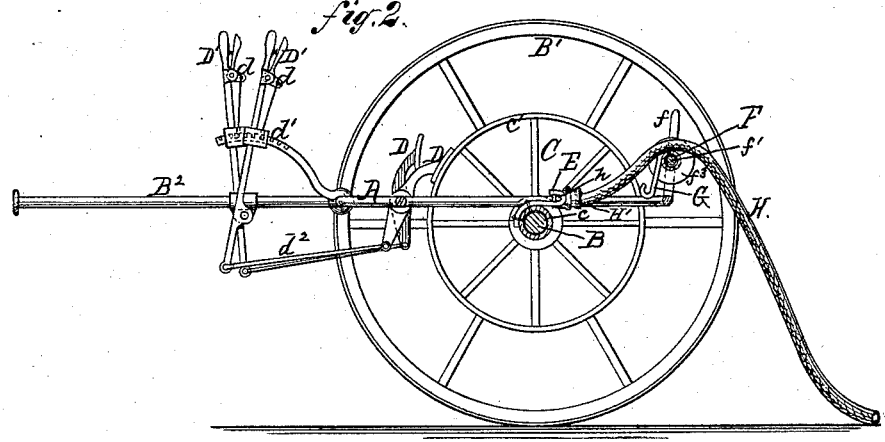
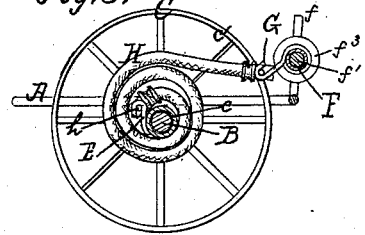
Witnesses:
Henry Gilling.
A. S. Fitch.
Inventor:
John T. Noble
By J. W. Fitch.
Atty

UNITED STATES PATENT OFFICE.

JOHN T. NOBLE, OF ST. LOUIS, MICHIGAN.

HOSE-CART.

SPECIFICATION forming part of Letters Patent No. 280,323, dated June 26, 1883.

Application filed September 16, 1882. (No model.)

*To all whom it may concern:*

Be it known that I, JOHN T. NOBLE, of St. Louis, county of Gratiot, State of Michigan, a citizen of the United States, have invented certain Improvements in Hose-Carts, of which the following is a full, clear, and exact description, reference being had to the accompanying drawings, forming part of this specification.

My invention relates to hose-carriages; and it consists in the devices and their combinations hereinafter particularly described, and more at length recited in the claims.

Figure 1 is a plan of a hose-cart containing my invention. Fig. 2 is a vertical side elevation of the same, partly in section; and Fig. 3 is a side elevation of one of the hose-reels, showing a length of hose coiled thereon.

A is the frame of the cart, mounted upon a single axle, B, which is provided with the wheels B', thus constituting a two-wheeled carriage. $B^2$ is the tongue, and the carriage may be propelled by man or horse power. When the latter is employed it is preferable that a seat for the driver should be placed upon the front of the frame. Upon the single axle B and between the wheels B' are placed two separate and distinct reels, C and C'. These reels are constructed, in the usual manner, with an axle, $c$, and end wheels, $c'$. The axles $c$ are tubular, and are passed onto and adapted to turn freely on the axle B. They are separated at the longitudinal center of the axle B by a collar or shoulder, $b$, and are capable of independent rotary motion on the axle B. Each reel is provided with a brake, D, mounted to swing on the front of the frame A and to bear upon the face of the reel-wheel, which is at the center of the carriage. The brakes D are each independently controlled by a hand-lever, D', having a spring ratchet attachment, $d$, working in a rack, $d'$, a rod, $d^2$, connecting the lever end to the brake-lever, as seen in Fig. 2. The hand-lever D' is in convenient reach of the driver.

By means of the two independent reels C and C', working on the single axle B of the carriage, I am enabled to unreel and lay a single length of hose from one of the reels, or two lengths of hose—one from each reel—simultaneously from the same single carriage. This latter operation is frequently necessitated in the case of large conflagrations or fires in the upper stories of high buildings, when it is required to unite two courses of hose to a "siamese" in order to secure a sufficient volume and force of water. I am enabled to lay these two courses of hose side by side with greater rapidity and facility by means of my described apparatus than where a single reel only is employed on the cart. By means of the brakes D, I am able to control the paying out of the hose with precision, while at the same time the said brake may be employed to control the momentum and speed of the cart when traveling, the force exerted by the brakes upon the rims of the reel-wheels being felt upon the main axle B of the cart through the tubular axles $c$ of the reels mounted on said axle B; and it is evident that when the machine is traveling both brakes may be applied, and thus an augmented force applied to check the motion of the cart.

Upon each of the axles $c$ of the reels C is mounted the pair of hooks E. These hooks are constituted by looping a piece of rod or strap iron about the axles in the manner plainly shown in the drawings; and passing the ends of the said piece through the double of the loop, as shown, and thus fashioning the extremities of said ends into the form of parallel or pairs of hooks. An exceedingly strong and inexpensive hook is thus constituted. These hooks extend tangentially or radially from the face of the axles $c$, and those of each pair are arranged at such a distance apart as will permit the hose end and its coupler attachment to pass between them, and so that the lugs upon the couplers will slip into said hooks, one on each side. This is shown in Figs. 1 and 2, H being the hose, H' the coupler, and $h$ the lugs. By means of these pairs or twin hooks E the hose may be readily and effectively attached to the reel preparatory to reeling, while when the hose is unreeled its entire length its end will, as the reel makes its final turn, drop from the hooks, and all back reeling and consequent strain on the hose be obviated.

Upon suitable standards, $f$, on the rearward part of the cart-frame are mounted the friction-rollers F, one to the rear of each of the reels C. These rollers are tubular, mounted on a rod, $f'$, and have a collar or shoulder, $f^2$, between their adjacent ends and flanges $f^3$ at their outer ends, so that they are capable of independent action, and the hose is prevented from escaping them endwise. The hose is paid out or reeled up over these rollers, and hence friction on the hose-body is avoided. Upon these rollers are hung or mounted the twin hooks G, similar in construction to the hooks E. The hooks G serve to secure the free end of the reeled hose, as seen plainly in Fig. 3.

My improved hose-carriage, constructed as described, is an effective and easily operated machine, and will enable the operators to perform more service and with greater facility and expedition than the hose-carts now generally in use.

What I claim as my invention, and desire to secure by Letters Patent, is—

1. In a hose-cart, the combination of the two separate and distinct reels C and C', mounted on one and the same axle, B, of the cart, with their adjacent ends separated by the collar $b$, and within the cart-frame A, each reel being provided with an independent brake composed of a shoe, D, working on the rim of the reel-wheel, the link $d^2$, and lever D', pivoted on the tongue of the cart, and provided with spring-pawl $d$ and rack $d'$, whereby either a single or double length of hose may be at pleasure unreeled from the cart at a single operation, as an emergency may require, and substantially as specified.

2. In a hose-cart, the combination, with the distinct reels C and C', working on the single axle B of the cart, and having the separating-collar $b$, and provided with the independent brakes D D, controlled by levers D' D', pivoted on the tongue of the cart, of the hose end hooks, E, composed of a piece of rod or strap iron doubled and looped around the reel-axle, with the ends thereof in the form of parallel hooks, all substantially as and for the purpose specified.

JOHN T. NOBLE.

Witnesses:
C. W. GIDDINGS,
R. D. PERRINE.